(12) United States Patent
Carpenter et al.

(10) Patent No.: US 11,125,103 B2
(45) Date of Patent: Sep. 21, 2021

(54) GAS TURBINE GENERATORS

(71) Applicant: Delta Motorsport Limited, Northampton (GB)

(72) Inventors: Nicholas Carpenter, Bicester (GB); Scott Herring, Buckingham (GB); Mark Wilksch, Ashton (GB)

(73) Assignee: Delta Motorsport Limited, Northampton (GB)

( * ) Notice: Subject to any disclaimer, the term of this patent is extended or adjusted under 35 U.S.C. 154(b) by 31 days.

(21) Appl. No.: 16/332,881

(22) PCT Filed: Sep. 13, 2017

(86) PCT No.: PCT/GB2017/052692
§ 371 (c)(1),
(2) Date: Mar. 13, 2019

(87) PCT Pub. No.: WO2018/051080
PCT Pub. Date: Mar. 22, 2018

(65) Prior Publication Data
US 2019/0360352 A1  Nov. 28, 2019

(30) Foreign Application Priority Data
Sep. 13, 2016 (GB) ..................... 1615491

(51) Int. Cl.
*H02K 7/08* (2006.01)
*F01D 15/10* (2006.01)
(Continued)

(52) U.S. Cl.
CPC ............ *F01D 15/10* (2013.01); *F01D 25/16* (2013.01); *F02C 3/05* (2013.01); *F02C 6/12* (2013.01); *F02C 7/08* (2013.01); *F16C 2360/23* (2013.01)

(58) Field of Classification Search
CPC ............................ H02K 7/085; F01D 25/16
See application file for complete search history.

(56) References Cited

U.S. PATENT DOCUMENTS 4,350,912 A * 9/1982 Burton ................. H02K 5/1672
310/90
4,485,310 A * 11/1984 de Valroger ............ F01D 15/10
123/565
(Continued)

FOREIGN PATENT DOCUMENTS

CN 1727654 12/2011
CN 102439300 8/2015
(Continued)

OTHER PUBLICATIONS

ISA, "International Application Serial No. PCT/GB/2017/052692, Search Report and Written Opinion dated Nov. 17, 2017", 10 Pages.
(Continued)

*Primary Examiner* — Dang D Le
(74) *Attorney, Agent, or Firm* — Strategic Patents, P.C.

(57) ABSTRACT

A radial flow gas turbine generator (10) where the gas turbine generator (10) includes a shaft (30) having a rotor (20) of the generator (10), a compressor wheel (16) and a turbine wheel (18) fixed thereto. The shaft (30) is supported for rotation by a single bearing arrangement (38 provided at an axial position on the shaft (30) that is between the rotor (20) and the compressor wheel (16).

15 Claims, 6 Drawing Sheets

(51) Int. Cl.
*F01D 25/16* (2006.01)
*F02C 3/05* (2006.01)
*F02C 6/12* (2006.01)
*F02C 7/08* (2006.01)

(56) References Cited

U.S. PATENT DOCUMENTS

| | | | |
|---|---|---|---|
| 5,753,986 A * | 5/1998 | Ohtani | H02K 5/136 |
| | | | 310/52 |
| 5,912,516 A | 6/1999 | Atkinson et al. | |
| 6,023,135 A | 2/2000 | Gilbreth et al. | |
| 6,198,174 B1 | 3/2001 | Nims et al. | |
| 6,315,456 B1 | 11/2001 | Tanimoto et al. | |
| 6,429,560 B1 * | 8/2002 | Oelsch | F16C 33/765 |
| | | | 277/410 |
| 7,804,213 B2 * | 9/2010 | Hoffman | F04D 25/0646 |
| | | | 310/90 |
| 8,613,558 B2 * | 12/2013 | Takahashi | F16C 19/06 |
| | | | 384/518 |
| 9,018,814 B2 * | 4/2015 | Watanabe | H02K 5/163 |
| | | | 310/90 |
| 2002/0084702 A1 | 7/2002 | Albou et al. | |
| 2004/0200215 A1 | 10/2004 | Woollenweber et al. | |
| 2006/0024178 A1 * | 2/2006 | Chen | F04B 17/00 |
| | | | 417/407 |
| 2006/0138878 A1 | 6/2006 | Hoffman et al. | |
| 2010/0201126 A1 | 8/2010 | Chen et al. | |
| 2012/0051681 A1 | 3/2012 | Takahashi et al. | |

FOREIGN PATENT DOCUMENTS

| | | |
|---|---|---|
| CN | 105888819 | 8/2016 |
| DE | 102009053102 | 5/2011 |
| JP | 56-80663 | 6/1981 |
| JP | 62-112318 | 5/1987 |
| JP | S63-181637 | 7/1988 |
| JP | 2003120214 | 4/2003 |
| JP | 2003307103 | 10/2003 |
| JP | 2009204004 | 9/2009 |
| WO | WO-2010081560 | 7/2010 |

OTHER PUBLICATIONS

IPO, "UK Application No. 1615491.6 Search Report dated Mar. 7, 2017", 4 Pages.
ISA, "PCT Application No. PCT/GB2017/052692 International Preliminary Report on Patentability dated Mar. 28, 2019", 7 pages.
Chinese Patent Office, "Application No. CN201780069954.X First Office Action dated Apr. 2, 2021", 6 pages.
IP India, "Application No. IN201917012218 Examination Report dated Mar. 25, 2021", 6 Pages.

* cited by examiner

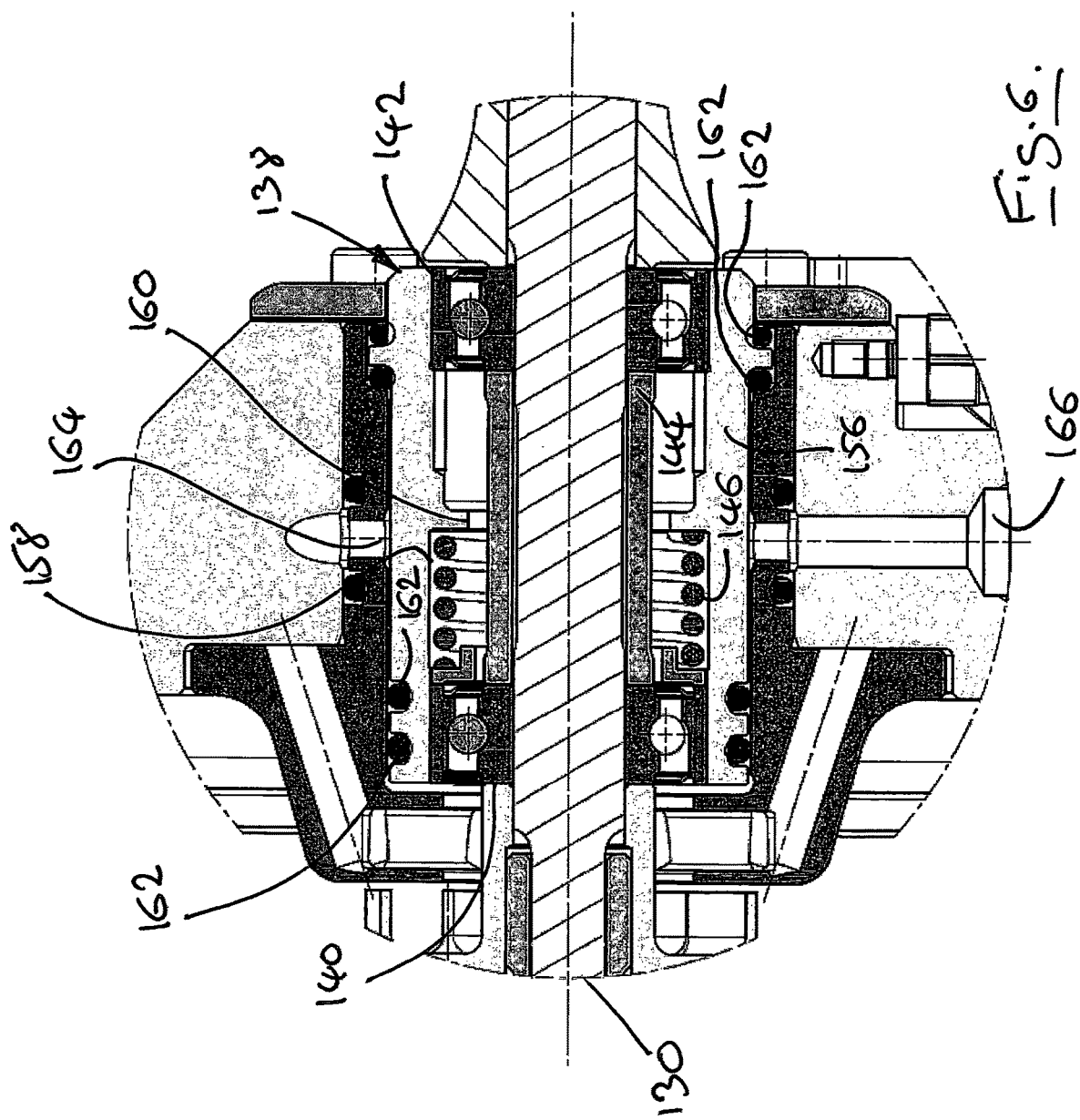

GAS TURBINE GENERATORS

CROSS-REFERENCE TO RELATED APPLICATIONS

This application is a U.S. national stage application under 35 USC § 371 of International Patent Application No. PCT/GB2017/052692, filed on Sep. 13, 2017, which claims priority to United Kingdom Patent Application GB1615491.6, filed on Sep. 13, 2016, with the entire contents of each of the foregoing hereby incorporated herein by reference.

BACKGROUND

The present invention relates to gas turbine generators and particularly to a bearing arrangement for a gas turbine generator. More specifically, though not exclusively, the present invention relates to a gas turbine generator suitable for use in a range extender apparatus for a hybrid electric vehicle (HEV) or electric vehicle (EV).

Gas turbine engines are used in a variety of applications including the generation of electric power. To generate electric power the gas turbine engine is coupled to an electrical generator such as a direct current dynamo or alternating current alternator. The gas turbine and generator can be coupled indirectly to one another through a speed changing device such as a gearbox. Alternatively, the gas turbine and generator can be coupled directly so that the gas turbine and generator rotate at the same speed. The gas turbine compressor and turbine elements can be of the axial flow or radial flow type. Where radial flow elements are used it is typically possible to use only a single stage compressor and single stage turbine and the resulting short assembly makes it possible for these rotating elements to be mounted in an overhung arrangement with the supporting bearings adjacent to the colder compressor side.

Where the compressor, turbine and generator are directly coupled and rotate at the same speed, the resulting rotating assembly is supported by a bearing system to resist the weight, thrust and other loads inherent in the machine. In the known art for overhung direct drive gas turbine generators two bearings are used, and these bearings are disposed on either side of the generator. In such an arrangement the compressor and turbine are overhung with respect to the bearings, while the rotating elements of the generator are supported between the two bearings. Such an arrangement is described in, for example, US 2002/0084702.

A further feature of the known art is that the bearings may be provided with a lubrication system that maintains a supply of oil that both lubricates and cools the bearings. Because of the high rotating speed typical of gas turbines, correct bearing lubrication and cooling is critical to achieving adequate bearing life.

Alternative solutions which eliminate the need for bearing lubrication are disclosed in, for example, prior art references US 2006/024178 and U.S. Pat. No. 6,198,174. US 2006/024178 describes the use of two air foil bearings located on the shaft on either side of the generator. A similar air foil bearing arrangement is described in U.S. Pat. No. 6,198,174.

SUMMARY

According to a first aspect of the present invention there is provided a radial flow gas turbine generator, the gas turbine generator including a shaft having a rotor of the generator, a compressor wheel and a turbine wheel of the gas turbine fixed thereto, the shaft being supported for rotation by a single bearing arrangement, wherein said single bearing arrangement is provided at an axial position on the shaft that is between the rotor of the generator and the compressor wheel.

The provision of a single bearing arrangement at an intermediate position on the shaft results in portions of the shaft extending from opposing sides of the bearing arrangement. It will be understood by the skilled addressee that the portions of the shaft extending from opposing sides of the bearing arrangement are unsupported at their respective distal ends. The single bearing arrangement thus provides the only rotational support for the shaft. The use of a single bearing arrangement reduces the complexity of the gas turbine generator by eliminating the need for additional bearings at other axial locations on the shaft. The shaft is this supported at a single location by the single bearing arrangement.

The single bearing arrangement may include one or more bearings. The or each bearing may be a mechanical contact bearing.

One of said portions of the shaft carries the rotor of the generator, while the other of said portions of the shaft carries the compressor and turbine wheels. As such, the rotor, compressor and turbine wheels are overhung on opposing sides of the bearing arrangement.

The bearing arrangement may include two or more mechanical contact bearings. The bearings may be provided in a module or sub assembly that maintains a predetermined spatial relationship between the bearings. Such a module may facilitate the fitting and removal of the bearings as a single unit. The bearings may be separated within the module or sub assembly by a spacer.

The bearings may be mounted within a module configured as a sleeve. In such an embodiment the bearings may be mounted in a spaced apart relationship to one another within the sleeve. A resilient member in the form of a coil spring may be located between the bearings in the sleeve. The coil spring may be located within the sleeve such that a first end of the spring abuts on of the bearings and an opposite end of the spring abuts a seat provided on the sleeve.

The mechanical contact bearings may be rolling element bearings which include an inner race, an outer race, and a plurality of rolling elements disposed between the inner and outer races.

The mechanical contact bearing arrangement may be air cooled. The bearing arrangement may be cooled by air drawn into the generator for the purpose of cooling the generator. In such an embodiment, the rotor of the generator may be provided with a fan to draw air into the generator. Additionally, or alternatively, the mechanical contact bearing arrangement may be cooled by air drawn into the gas turbine by the compressor wheel.

Where cooling of the mechanical contact bearing arrangement is achieved by air drawn into both the generator and the compressor wheel, it will be appreciated that two separate air flows over the mechanical contact bearing arrangement are provided. Each airflow flows in an opposite axial direction to the other, such that one airflow impinges upon and cools a first end of the bearing arrangement, and the other airflow impinges upon and cools an opposite second end of the bearing arrangement.

Advantageously the mechanical contact bearing arrangement may be of a self-lubricating configuration and as such eliminate the need for a separate bearing lubrication system to be provided.

Alternatively, the bearings may be cooled and lubricated by an appropriately configured lubrication system.

According to a further aspect of the present invention there is provided a method of operating a gas turbine generator as described above in relation to the first aspect of the invention, wherein the operating speed of the gas turbine generator is greater than the first resonant speed.

According to another aspect of the present invention there is provided an electric vehicle (EV) or a hybrid electric vehicle (HEV) having a gas turbine generator of the type described above.

An embodiment of the present invention will now be described with reference to the accompanying drawings in which:

BRIEF DESCRIPTION OF THE FIGURES

FIG. 6 shows an enlarged detail of the cross-sectional view of FIG. 5.

DETAILED DESCRIPTION

Figure 1:
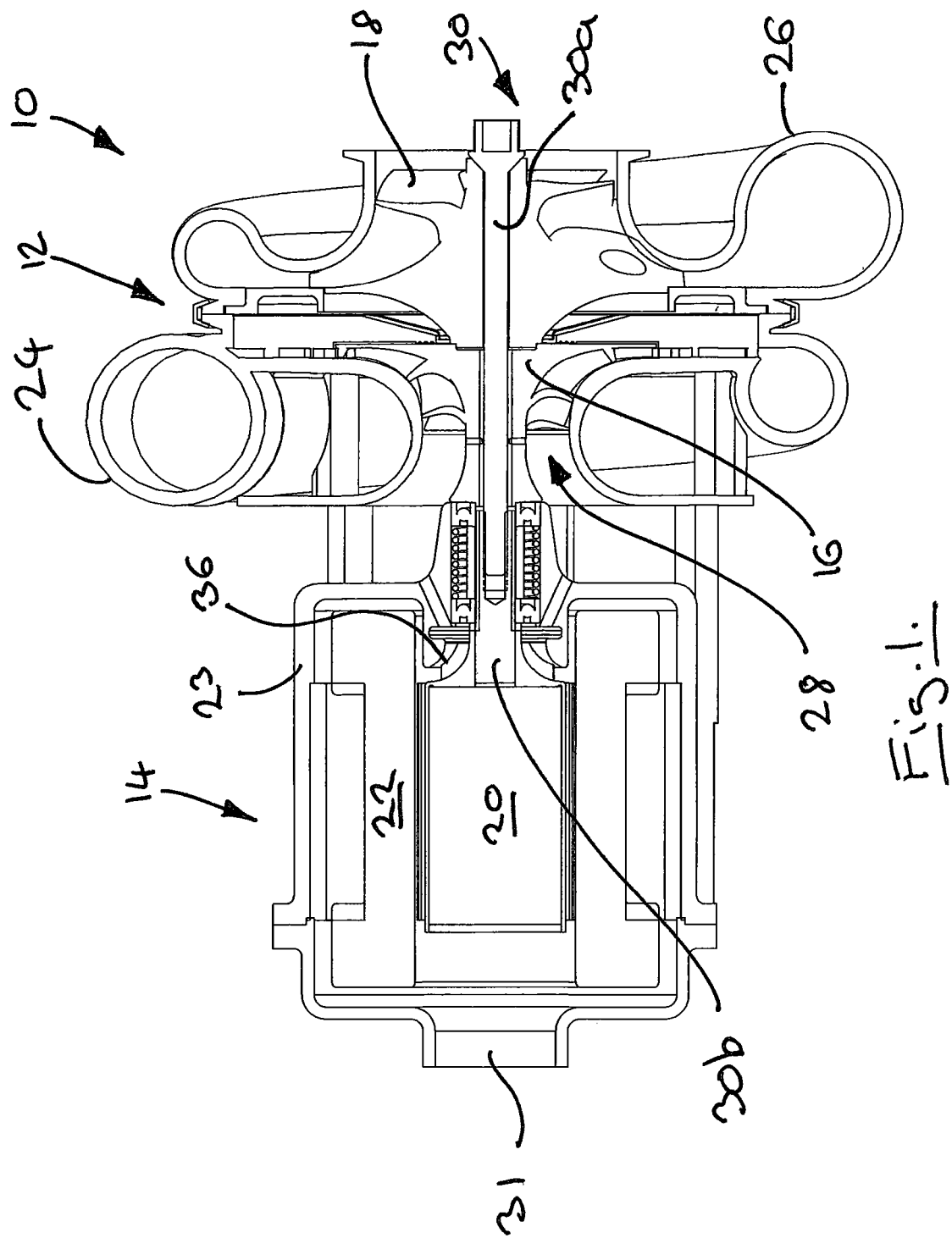
FIG. 1 shows a longitudinal cross-sectional view of a gas turbine generator including a bearing arrangement according to the present invention.
Figure 2:
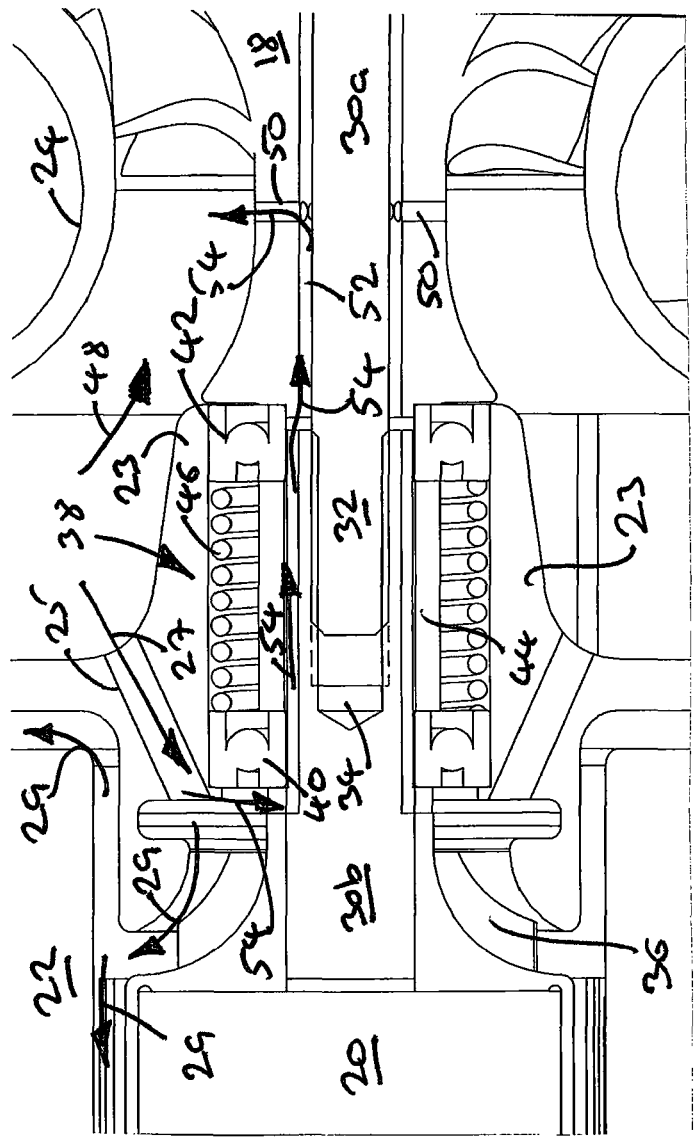
FIG. 2 shows an enlarged longitudinal cross-sectional view of the bearing arrangement of FIG. 1.
Figure 3:
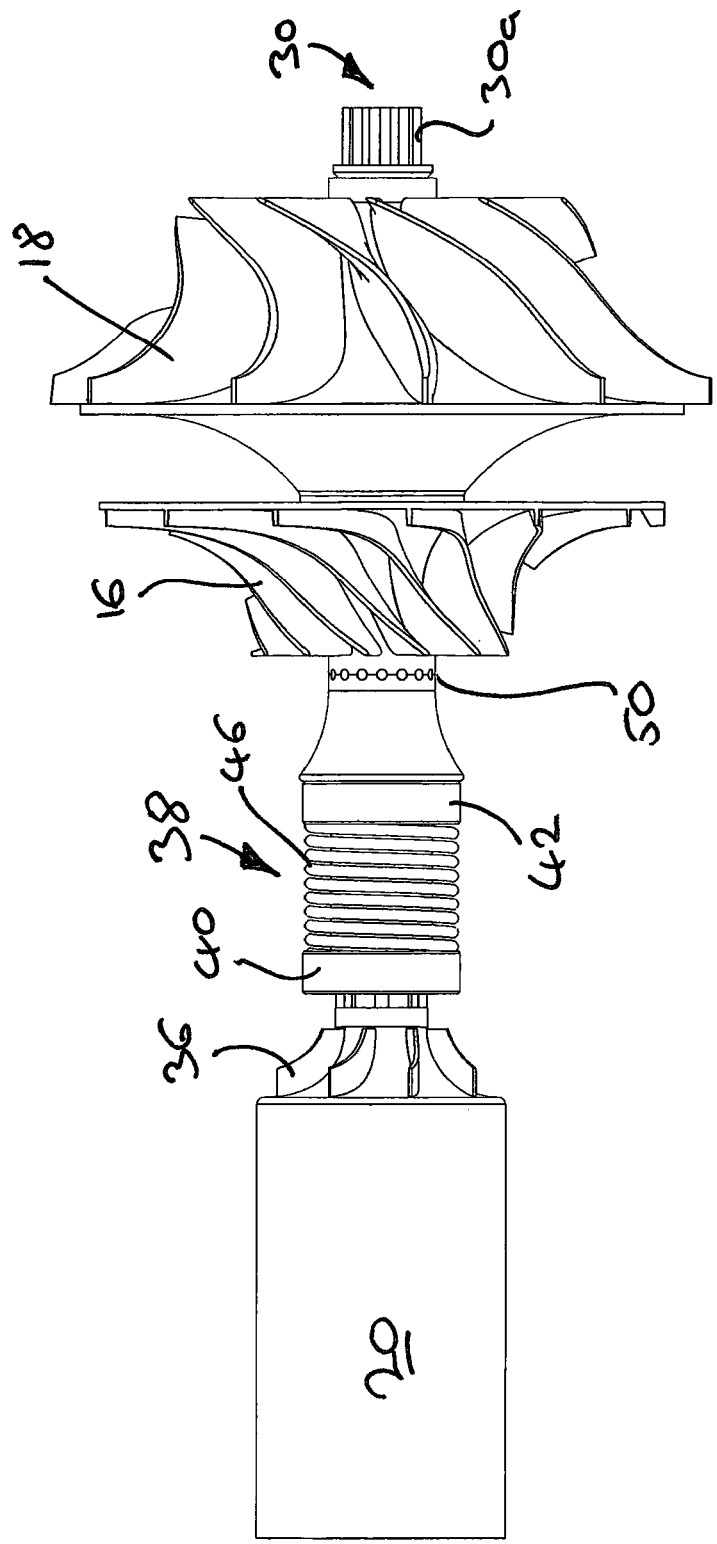
FIG. 3 shows a side view of the rotating assembly of the gas turbine generator including the bearing arrangement, generator rotor, and gas turbine compressor and turbine.
Figure 4:
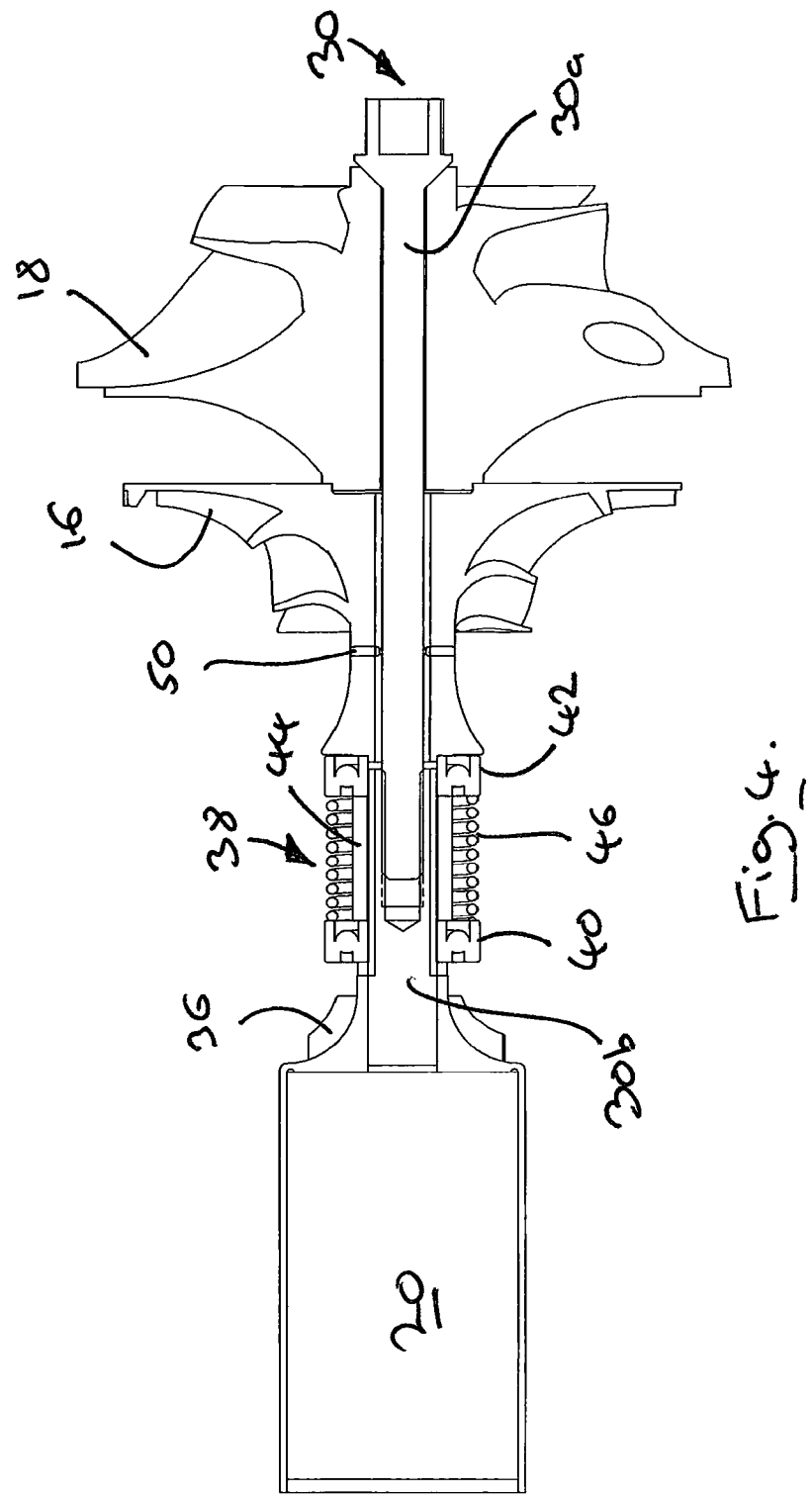
FIG. 4 shows a longitudinal cross-sectional view of the rotating assembly, bearing arrangement, generator rotor and gas turbine compressor and turbine of FIG. 3.

Referring firstly to FIGS. 1 to 4 there is shown a gas turbine generator generally designated 10. The generator 10 includes a radial flow gas turbine section 12 and an electrical generation section 14. The gas turbine section 12 includes a compressor wheel 16 and a turbine wheel 18. The electrical generation section 14 includes a rotor 20 and a stator 22. The rotor and stator 20,22 are surrounded by a casing 23.

The compressor and turbine wheels 16, 18 are provided with respective casings 24,26. The gas turbine section 12 is operable in a conventional manner which is known to those skilled in the art. Specifically, air drawn into the compressor wheel casing 24 through an annular inlet 28 thereof is compressed by the compressor wheel 16. Fuel is added to the compressed air and the fuel-air mixture is caused to combust. The expanding combustion gases pass to the turbine wheel casing 26 whereupon they impinge upon the turbine wheel 18 and cause rotation thereof. Energy may subsequently be recovered from the combustion gasses, for example via a heat exchanger. The recovered energy may be used to heat the air compressed by the compressor wheel prior to combustion.

The electrical generation section 14 operates in a conventional manner which is known to those skilled in the art where rotation of the rotor 20 relative to the stator 22 generates electrical energy.

The compressor and turbine wheels 16,18 and rotor 20 are coupled for rotation on a common shaft 30. In the embodiment shown, the shaft 30 comprises a turbine shaft section 30a and a generator shaft section 30b which are connected to one another. In the embodiment shown the connection is effected by a threaded projection 32 of the turbine shaft section 30a being received in a correspondingly threaded recess 34 of the generator shaft section 30b. It will be appreciated by the skilled addressee that other methods of joining the shaft sections 30a,30b may be employed. Alternatively, a single piece shaft may be utilised.

The rotor 20 is further provided with an arrangement which, in use, supplies a flow of cooling air to the electrical generation section 14. In the embodiment shown, the arrangement is a radial cooling fan 36. It will be appreciated that other forms of arrangement may be utilised to move air in the manner described.

Rotation of the cooling fan 36 causes air to be drawn into the casing 23 through apertures 25 of the casing as indicated by arrow 27. The air then passes around the stator 22, and between the stator 22 and rotor 20 as indicated by arrows 29. The air exits the casing 23 via an aperture 31 provided in the end thereof.

In the embodiment illustrated in the figures the shaft 30 is supported for rotation in a bearing arrangement 38 provided in the electrical generation section casing 23. Also in the embodiment shown, the bearing arrangement 38 comprises a first annular bearing 40 hereinafter referred to as the generator side bearing 40, a second annular bearing 42 hereinafter referred to as the turbine side bearing 42, an annular spacer 44 positioned intermediate the bearings 40,42, and an axial spring 46 which extends between the bearings 40,42 and surrounds the annular spacer 44. In the embodiment shown, the bearings 40,42, spacer 44 and spring 46 are separate. In an alternative embodiment the bearings 40,42, spacer 44 and spring 46 may be incorporated into a module or cassette which can be fitted as a single item. Such an embodiment is described below with reference to FIGS. 5 and 6.

Each of the bearings 40,42 is a rolling element bearing. Each bearing 40,42 includes an inner race, an outer race and a plurality of rolling elements disposed between the inner and outer races.

It will be noted that bearing arrangement 38 is provided at an intermediate position on the shaft 30 such that turbine shaft section 30a extends from one side of the bearing arrangement 38, and the generator shaft section 30b extends from the opposite side of the bearing arrangement 38. It will further be noted that neither the turbine shaft section 30a nor the generator shaft section 30b are supported along their respective lengths by any other bearing arrangements. It will thus be understood that both the rotor 20 of the electrical generation section 14, and the compressor and turbine wheels 16, 18 of the gas turbine section 12 are overhung with respect to the bearing arrangement 38.

By providing the bearing arrangement 38 at the aforementioned intermediate position of the shaft 30 enables the bearings 40,42 to be air cooled. As can readily be seen from the figures, the generator side bearing 40 is located adjacent the cooling fan 36 and is surrounded by the apertures 25 through which air is drawn by the cooling fan 36. The turbine side bearing 42 is located adjacent the compressor inlet 28. Both bearings 40,42 are thus provided at the respective "cool" ends of the gas turbine section 12 and electrical generation section 14.

Optionally, additional cooling of the bearing arrangement 38 may be effected by utilising the air drawn into the compressor inlet 28 as indicated by arrow 48. The compressor wheel 16 is provided with a plurality of through apertures 50 which extend between the compressor inlet 28 and an annular space or passages 52 defined between the compressor wheel 16 and the shaft 30. Reduced pressure before the blades of the compressor causes some of the air entering the casing 23 to be drawn towards the compressor wheel apertures 50 as indicated by arrows 54.

Air cooling of the bearing arrangement 38 permits the use of grease or oil wick lubrication for the bearings 40,42 and thus eliminates the need for a relatively complex lubrication system that feeds oil to the bearings 40,42. Air cooling of the bearing arrangement 38 further enables self-lubricating bearings 40,42 to be used as the temperatures experienced by the bearings 40,42, in use, do not exceed those at which the lubricating medium within the bearings 40,42 degrades.

Figure 5:
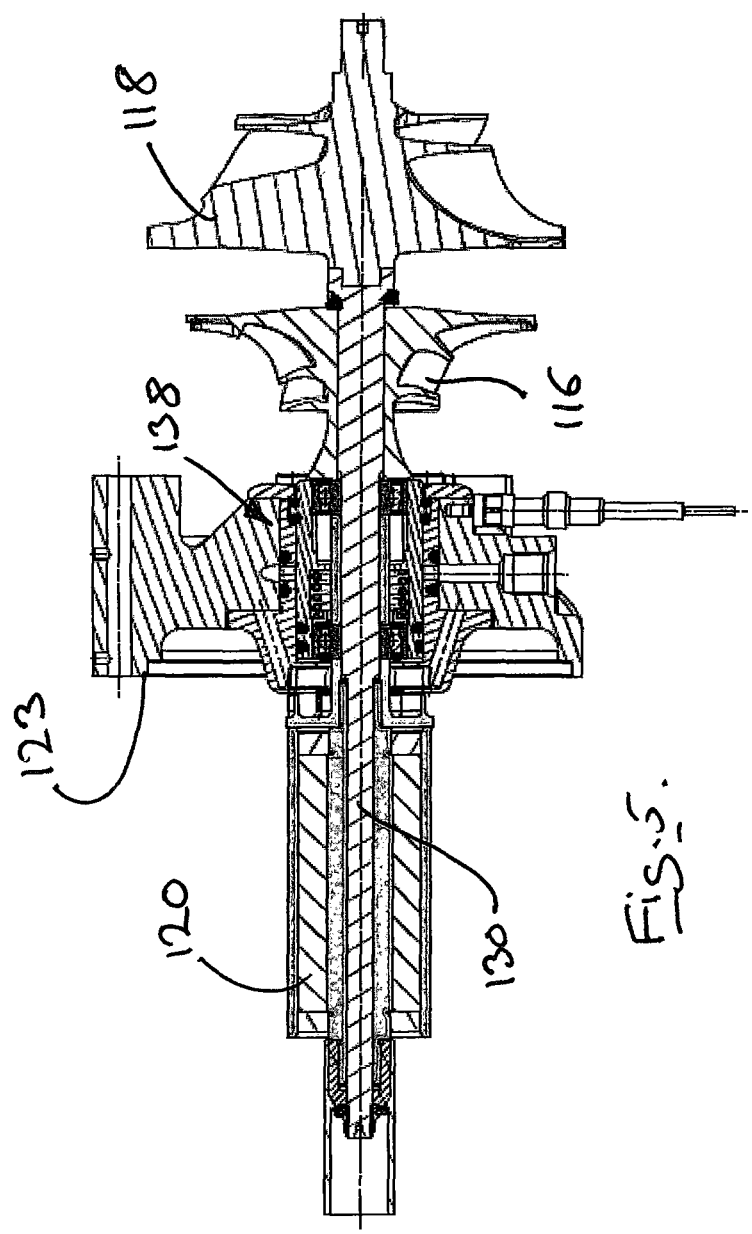
FIG. 5 shows a longitudinal cross-sectional view of another rotating assembly, bearing arrangement, generator rotor and gas turbine compressor and turbine.

Referring now to FIGS. 5 and 6 there is shown longitudinal cross-sectional view of another rotating assembly, bearing arrangement, generator rotor and gas turbine compressor and turbine generally designated 100. Features common to the embodiment of the invention described with reference to FIGS. 1 to 4 are identified with like reference numerals prefixed with "1".

As before, the bearing arrangement 138 includes two bearings 140,142 which are maintained at a required axial separation with respect to one another by a spacer 144. In contrast to the bearing arrangement 38 of FIGS. 1 to 4, the bearings 140,142 are located within a tubular sleeve 156. The bore 158 of the sleeve 156 is provided with an annular seat 160 against which is located one end of a coil spring 146. The opposing end of the coil spring 146 abuts the bearing 140 which is proximal to the rotor 120. It will be appreciated that the mounting of the bearings 140,142 with a sleeve 156 enables the bearing arrangement 138 to be pre-assembled before being fitted to an appropriately sized bore of the casing 123.

The sleeve 156 is further provided around its external periphery with a plurality of elastomeric rings 162. In the embodiment shown the sleeve 156 is provided four rings 162 which are provided in pairs at opposing ends of the sleeve 156. The function of these elastomeric rings 162 is twofold. Firstly, the rings 162 define a complaint mounting arrangement for the sleeve 156, and thus the shaft 130, within the casing 123. The pairs elastomeric rings 162 further serve to define an annular chamber 164 around the external periphery of the sleeve 156. The chamber 164 may be filled with a liquid such as oil through a port 166 in the casing 123 to damp movement of the sleeve 156 and shaft 130 in directions which are substantially perpendicular to the longitudinal centerline axis of the shaft 130.

It will be understood by the skilled addressee that for a gas turbine generator 10 of the type described above to operate reliably, it must operate in such a way that harmful vibrations are not excited for any significant period of time. For such generators 10, the mass and stiffness characteristics may be arranged such that the generator 10 always operates at a speed lower than the first resonant vibration speed. Alternatively, such a generator 10 may be designed to operate at a speed above one or more resonant frequencies. Such a generator 10 would typically be accelerated through resonant speeds at a sufficient rate that no significantly harmful vibrations occur.

While the embodiment described above relates to a gas turbine generator where the bearings are air cooled and grease lubricated, it will be appreciated that the double overhung configuration of the rotor, and compressor and turbine may be used in conjunction with other bearing arrangements. For example, the double overhung configuration may be used in conjunction with a conventional pressurised oil feed lubrication and cooling system. Alternatively, the double overhung configuration may be used in conjunction with a lubrication system where lubricant is supplied to the bearings from a reservoir by a wick.

The gas turbine generator of the present invention may be used on an electric vehicle (EV) or hybrid electric vehicle (HEV) as a range extender apparatus. More specifically, the gas turbine generator may be operated to produce electrical power for the purpose of recharging battery cells of the EV or HEV.

The invention claimed is:

1. A radial flow gas turbine generator, the radial flow gas turbine generator including:
   a radial flow gas turbine section and an electrical generation section;
   a shaft having a rotor of the electrical generation section, with a compressor wheel and a turbine wheel of the gas turbine section fixed to the shaft; and
   a single bearing arrangement supporting the shaft for rotation, wherein said single bearing arrangement is at an axial position on the shaft between the rotor of the electrical generation section and the compressor and turbine wheel of the gas turbine section, wherein the rotor of the electrical generation section and the compressor of the gas turbine section are overhung on opposing sides of the single bearing arrangement.

2. The gas turbine generator as claimed in claim 1 wherein the single bearing arrangement includes two or more mechanical contact bearings.

3. The gas turbine generator as claim 2 wherein the mechanical contact bearings are rolling element bearings.

4. The gas turbine generator as claimed in claim 2 wherein the bearing arrangement includes bearings in a module that maintains a predetermined relationship between the bearings.

5. The gas turbine generator as claimed in claim 4 wherein the bearings are mounted within a sleeve.

6. The gas turbine generator as claimed in claim 5 wherein the bearings are mounted in a spaced apart relationship to one another within the sleeve.

7. The gas turbine generator as claimed in claim 6 wherein a resilient member is located between the bearings in the sleeve.

8. The gas turbine generator as claimed in claim 7 wherein the resilient member is a coil spring.

9. The gas turbine generator as claimed in claim 8 wherein the coil spring is located within the sleeve such that a first end of the coil spring abuts one of the bearings and an opposite end of the coil spring abuts a seat provided on the sleeve.

10. The gas turbine generator as claimed in claim 1 wherein the bearing arrangement is air cooled.

11. The gas turbine generator as claimed in claim 1 wherein the bearing arrangement is self-lubricating.

12. The gas turbine generator as claimed in claim 1, further comprising an oil wick system configured to lubricate the bearing arrangement.

13. The gas turbine generator as claimed in claim 1, further comprising a recirculating lubrication system configured to cool and lubricate the bearing arrangement.

14. A method of operating a radial flow gas turbine generator as claimed in claim 1, wherein the operating speed of the radial flow gas turbine generator is greater than the first resonant speed.

15. A vehicle comprising:
   battery cells; and
   a gas turbine generator in electrical communication with the battery cells, the gas turbine generator including a radial flow gas turbine section and an electrical generation section, a shaft, a compressor wheel and a turbine wheel of the gas turbine section, and a single bearing arrangement, the shaft having a rotor of the electrical generation section, the compressor wheel fixed to the shaft, the turbine wheel fixed to the shaft, and the single bearing arrangement supporting the shaft for rotation, the single bearing arrangement at an axial position on the shaft between the rotor of the electrical generation section and the compressor and turbine wheel of the gas turbine section, wherein rotation of the shaft produces electrical power to recharge the battery cells, wherein the rotor of the electrical generation section and the compressor wheel of the gas turbine section are overhung on opposing sides of the single bearing arrangement.

\* \* \* \* \*